United States Patent
Gates

(10) Patent No.: US 10,491,855 B2
(45) Date of Patent: *Nov. 26, 2019

(54) ORIENTATION ADJUSTMENT FOR CASTING VIDEOS

(71) Applicant: Roku, Inc., Los Gatos, CA (US)

(72) Inventor: Gregory S. Gates, Saratoga, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,206

(22) Filed: May 22, 2018

(65) Prior Publication Data

US 2018/0270447 A1 Sep. 20, 2018

Related U.S. Application Data

(63) Continuation of application No. 15/633,954, filed on Jun. 27, 2017, now Pat. No. 10,021,341, which is a
(Continued)

(51) Int. Cl.
*H04N 7/01* (2006.01)
*H04N 11/20* (2006.01)
(Continued)

(52) U.S. Cl.
CPC ......... *H04N 7/0117* (2013.01); *H04N 19/112* (2014.11); *H04N 19/16* (2014.11); *H04N 19/172* (2014.11); *H04N 19/40* (2014.11); *H04N 21/2343* (2013.01); *H04N 21/234336* (2013.01); *H04N 21/234363* (2013.01); *H04N 21/25825* (2013.01)

(58) Field of Classification Search
CPC .... H04N 7/0117; H04N 19/112; H04N 19/16; H04N 19/172; H04N 19/40; H04N 21/61; H04N 21/234336; H04N 21/25825; H04N 21/6131; H04N 7/01; H04N 11/20; G06F 15/16
USPC ................................................. 348/441, 583
See application file for complete search history.

(56) References Cited

U.S. PATENT DOCUMENTS 8,601,018 B2 12/2013 Six et al.
9,214,128 B2 * 12/2015 Yamada ................... G09G 5/00
(Continued)

*Primary Examiner* — Trang U Tran
(74) *Attorney, Agent, or Firm* — Sterne, Kessler, Goldstein, & Fox P.L.L.C.

(57) ABSTRACT

System, method, and computer product embodiments for proving an orientation adjustment for casting visual content on a display device are described. A computing device selects an orientation adjustment to be used in transcoding a video having a frame and assigned an orientation. The computing device requests a transcoder within the computing device to transcode the frame based on the orientation adjustment to generate a transcoded frame. The transcoded frame is converted into a format comparable to a reference frame representing the frame that is corrected transcoded to the assigned orientation. Then, the computing device compares the converted frame with the reference frame to determine that the frame is transcoded correctly to the assigned orientation. If the frame is transcoded correctly, the computing device uses the selected orientation adjustment when transcoding visual content for casting or streaming on a display device in an orientation matching that of the visual content.

20 Claims, 6 Drawing Sheets

Related U.S. Application Data continuation of application No. 14/984,526, filed on Dec. 30, 2015, now Pat. No. 9,723,258.

(51) Int. Cl.
| | | |
|---|---|---|
| *H04N 19/112* | (2014.01) |
| *H04N 19/16* | (2014.01) |
| *H04N 19/172* | (2014.01) |
| *H04N 19/40* | (2014.01) |
| *H04N 21/2343* | (2011.01) |
| *H04N 21/258* | (2011.01) |

(56) References Cited

U.S. PATENT DOCUMENTS

| | | |
|---|---|---|
| 9,357,272 B2 | 5/2016 | Oyman |
| 9,451,535 B2 | 9/2016 | Gupta |
| 2008/0209442 A1 | 8/2008 | Setlur et al. |
| 2010/0060792 A1 | 3/2010 | Corlett et al. |
| 2012/0220221 A1* | 8/2012 | Moosavi ......... H04M 1/274516 455/41.1 |

\* cited by examiner

ORIENTATION ADJUSTMENT FOR CASTING VIDEOS

CROSS-REFERENCE TO RELATED APPLICATIONS

This application is a continuation of allowed U.S. application Ser. No. 15/633,954, filed Jul. 27, 2017, which is a continuation of U.S. application Ser. No. 14/984,526, filed Dec. 30, 2015, now U.S. Pat. No. 9,723,258, all of which are incorporated herein by reference in their entireties.

FIELD

This disclosure is generally directed to casting videos on a display device.

BACKGROUND

Currently, a content consumer uses mobile devices that are capable of recording video in very high quality at high bit rates. The content consumer may want to stream or cast content, such as the recorded video, from his mobile device across a home network to the television for display. But, conventional home networks may have limited streaming bandwidth or slow streaming speeds. Therefore, streaming such high quality videos may monopolize available streaming bandwidth increasing congestion in the network, and also significantly increase overall lag in the network. To address the slow or congested home networks, a mobile device may implement a real-time transcoding scheme or functionality to reduce the bitrate of high quality video content from the mobile device for streaming across home networks to, for example, the television.

Current mobile devices further enable content consumers to record video in one of two orientation modes: a portrait mode or a landscape mode. On some mobile devices, for example, the portrait mode may be enabled based on whether the mobile device is held right-side up or up-side down. Similarly, the landscape mode may be enabled whether the mobile device is rotated to the right or left from a right-side up or an upside down position. Due to a mobile device's specific hardware, firmware, and software implementation of transcoders, however, the mobile device often does not transcode a video or image content into the correct orientation. Therefore, a video in a portrait orientation mode, for example, may be incorrectly transcoded as landscape video content or vice versa. The television receives the incorrectly transcoded video and displays the misoriented video content.

BRIEF SUMMARY

Provided herein are system, method, article of manufacture and/or computer product embodiments, and/or combinations and sub-combinations thereof, for enabling visual content in a specific orientation to be transcoded on any computing device into visual content having that orientation. In an embodiment, a computing device selects an orientation adjustment to be used in transcoding a video having a frame and assigned an orientation. The computing device requests a transcoder within the computing device to transcode the frame based on the orientation adjustment to generate a transcoded frame. The transcoded frame is converted into a format comparable to a reference frame representing the frame that is corrected transcoded to the assigned orientation. Then, the computing device compares the converted frame with the reference frame to determine that the frame is transcoded correctly to the assigned orientation. If the frame is transcoded correctly, the computing device uses the selected orientation adjustment when transcoding visual content for casting or streaming on a display device in an orientation matching that of the visual content.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, method, article of manufacture and/or computer product embodiments, and/or combinations and sub-combinations thereof, for enabling visual content of a specific orientation to be transcoded on any portable device into visual content having that orientation.

Figure 1:
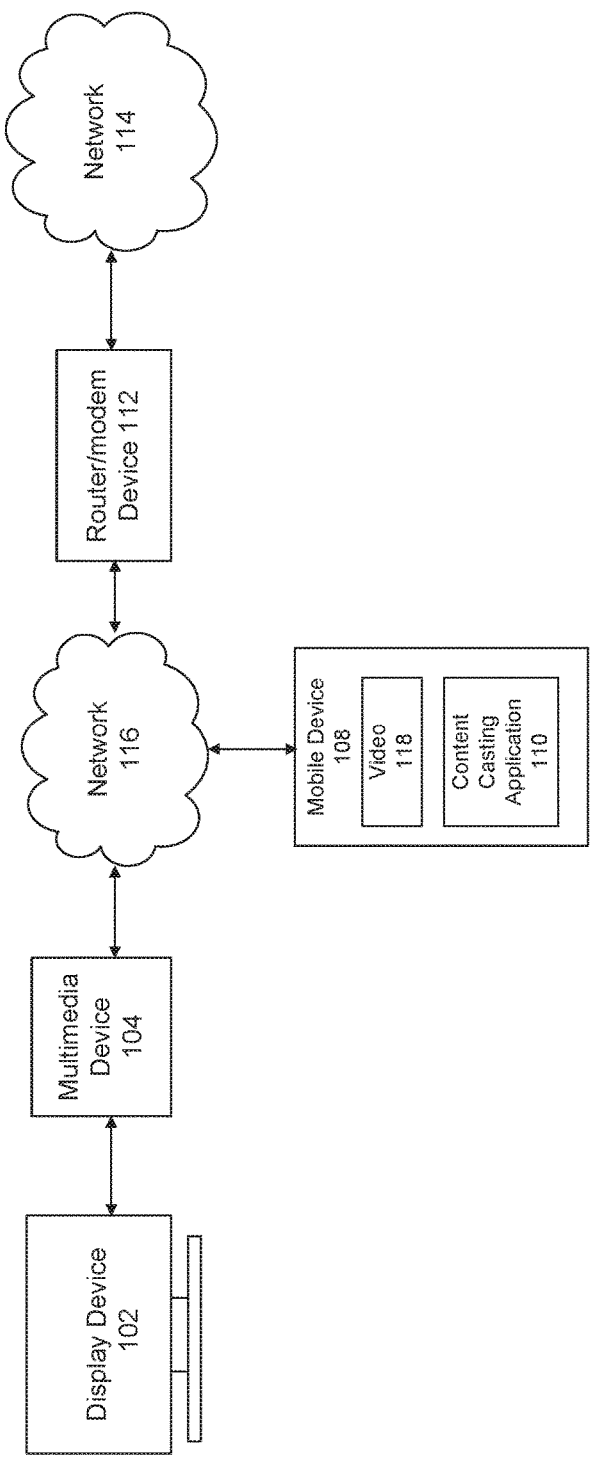
FIG. 1 is a block diagram of a content casting system, according to an embodiment.

FIG. 1 illustrates a content casting system 100, according to an embodiment. Content casting system 100 includes display device 102, multimedia device 104, mobile device 108, and router/modem device 112. In an embodiment, devices of content casting system 100 may be in close proximity and capable of communicating with each other via network 116 provided by router/modem device 112. Network 116 may be representative of a network, such as a local area network (LAN), provided via wired and/or wireless protocols. As shown, network 116 may be connected to another network, such as the Internet, represented by network 114, via router/modem device 112. In an embodiment, network 116 may have limited data bandwidth due to hardware or software limitations of router/modem device 112, hardware or software limitations of the wired or wireless medium that makes up one or more segments of network 116, or the software or hardware limitations of mobile device 108 or display device 102. Software limitations may include, for example, outdated firmware versions on router/modem device 112, or limitations in the networking protocols that make up network 116.

Router/modem device 112 may be one or more networking devices that enables the devices of content casting system 100 (e.g., multimedia device 104, display device 102, or mobile device 108) to access network 114 via network 116. For example, router/modem device 112 may be a single modem device having router capabilities. Network 114 may include any combination of LANs, wide area networks (WANs), the Internet, and/or any other local, regional, and global telecommunications networks. Network 114 may be implemented based on wired and/or wireless communication techniques, protocols, and technologies.

Mobile device 108 may be a portable computing device having a screen that is not optimally-sized for viewing visual content, such as pictures or video 118. In an embodiment, the screen of mobile device 108 is not optimal because it is smaller than the screen of display device 102. For example, mobile device 108 may be a lightweight device including smartphones, tablets, laptops, or other portable devices.

In an embodiment, mobile device 108 may download and install content casting application 110 via, for example, network 114 or the Internet. Content casting application 110 may enable a content consumer using mobile device 108 to cast or stream in real-time video 118 of a specific orientation (e.g., portrait or landscape) to display or play video 118 on display device 102 in that orientation.

Video 118 may be visual content, such as video content, stored or recorded by mobile device 108 in a specific container format, i.e., video file format, supported by mobile device 108. A file format specifies how data, such as video, is to be represented and stored as a file in a computer system, such as within mobile device 108. Example file formats for video data may include MPEG-4 Part 14 (MP4), WebM, Flash Video (FLV), Matroska (MKV), F4V, 3GP, or M4V among other file formats.

Video data, such as video 118, may typically be stored in a compressed form as specified by a video coding format supported by mobile device 108. A video coding format may specify how video content, such as a data file or bitstream, is to be compressed (and decompressed) during storage or transmission. Each of the example file formats provided above may support data compressed using specific compression/video coding formats. Example video coding formats may include MPEG-4 Part 2 (H.262), MPEG-4 Part 10 (H.264), H.263, Dirac, VP8, or High Efficiency Video Coding (HEVC) among other compression schemes or formats.

In an embodiment, to cast video 110 on display device 102 in real time, content casting application 110 may utilize transcoders on mobile device 108 for sending video 118 to display device 102 as streaming content. In an embodiment, to provide real-time transcoding, transcoders may implement streaming formats such as MPEG-DASH, Real-time Transport Protocol (RTP), or HTTP Live Streaming (HLS) among others.

In an embodiment, display device 102 or multimedia device 104 may be capable of processing specific file formats, video coding formats, or streaming formats different from that of video 118. Therefore, to enable video 118 to be casted on display device 102, content casting application 110 transcodes video 118 into a streaming format supported by display device 102 and/or multimedia device 104. Note that display device 102 and/or multimedia device 104 may also need to support the specific video coding format or file format used in generating the transcoded video in the streaming format to properly display the transcoded video. For example, although a streaming format, such as MPEG-DASH, may be video coding format agnostic, multimedia device 104 implementing MPEG-DASH may not be able to support the specific video coding format used to compress video 118 on mobile device 118. So, while transmitting video 118 using, for example, MPEG-DASH, content casting application 110 may re-compress video 118 using a video coding format, for example, H.264, that is supported by multimedia device 104.

In an embodiment, due to limited bandwidth, slow speeds, or high congestion of network 116, content casting application 110 may transcode video 118 by downsampling to reduce a resolution or bitrate for smoother, real-time casting. Additionally, in an embodiment, display device 102 may be capable of displaying visual content in only specific resolutions or bitrates. For example, display device 102 may not be capable of displaying 1080p content or displaying content that is encoded with a 17 Mbps bitrate. In this case, content casting application 110 may also transcode video 118 for sending to multimedia device 104. Specifically, content casting application 110 may convert a resolution and/or bitrate of video 118 into a potentially lower resolution and/or bitrate supported by display device 102.

For example, mobile device 108 may record a video at 17 Mbps, such as video 118, which may congest network 116 or may not be compatible with display device 102 or multimedia device 104. In such a case, content casting application 110 decodes video 118 into constituent video frames. Then, to reduce the bitrate of 17 Mbps to, for example, 3.5 Mbps, content casting application 110 may reduce the resolution of each video frame through, for example, downsampling. Then, content casting application 110 collects and encodes converted, downsampled video frames into a streaming format, such as HLS, supported by multimedia device 104 or display device 102. Due to the lower bitrate, video 118 may be streamed or casted on display device 102 more efficiently in real-time without congesting network 116.

In an embodiment, content casting application 110 may utilize a transcoder on mobile device 108 to transcode or convert video 118. A transcoder on mobile device 108 may be implemented using hardware, firmware, software, or a combination thereof specific to mobile device 108. Often, mobile device 108 is implemented using hardware from different original equipment manufacturers (OEMs) and software from different software vendors. The mix of manufacturers and vendors may lead to unexpected results. Particularly, due to the specialized hardware, firmware, or software of mobile device 108, video 118 of a specific orientation often transcodes into the wrong orientation. For example, video 118 may be a portrait video that is transcoded into a landscape video such that a content consumer may need to rotate his or her head ninety degrees to view the transcoded video displayed or played on display device 102.

Display device 102 may be a hardware device specifically designed for viewing media/visual content including images, video, webpages, games, or interactive content. Particularly, display device 102 may have a screen area more suitable, e.g., having a much larger screen area, for viewing multimedia content compared to screens of portable, lightweight devices such as mobile device 108 or another display device having a smaller screen. In an embodiment, display device 102 may be a monitor, a television, or a projector display.

In an embodiment, display device 102 may be capable of displaying or playing visual content from a device having a smaller screen, such as mobile device 108. In an embodiment, display device 102, such as display device 102, receives the visual content to be displayed from multimedia device 104 via coupling to multimedia device 104. The coupling may be provided via one of many cabling methods, such as via composite cables, Digital Visual Interface (DVI) cables, or High-Definition Multimedia Interface (HDMI) cables. In an embodiment, multimedia device 104 may be embedded or built in to display device 102. In this embodiment, instead of the described cabling methods, display device 102 may receive visual content from network 116 via wired (e.g., Ethernet) or wireless coupling to router/modem device 112.

Multimedia device 104 may be a computing device that manages multimedia content to be output or presented on display device 102. Example multimedia content may be data that is a combination of one or more of text, audio, images, video, etc. In an embodiment, multimedia device 104 may be a streaming stick or streaming player that is coupled to or integrated within display device 102. Multimedia device 104 may also be coupled to other computing devices, such as a digital video recorder (DVR) or a digital video disc (DVD) player. The coupling may be provided via a variety of cabling methods, such as via composite cables, DVI cables, or HDMI cables.

In an embodiment, to provide multimedia content casting, multimedia device 104 may receive transcoded multimedia content, such as video 118, from mobile device 108 via network 116. For example, multimedia device 104 may support streaming at a maximum bit rate of 3.5 Mbps, but video 118 may be recorded at 17 Mbps. In this case, multimedia device 104 may receive within a streaming format video 118, which has been downconverted to 3.5 Mbps. Then, multimedia device 104 may further convert or transmit the received transcoded multimedia content to display device 102 for display or presentation.

Figure 2:
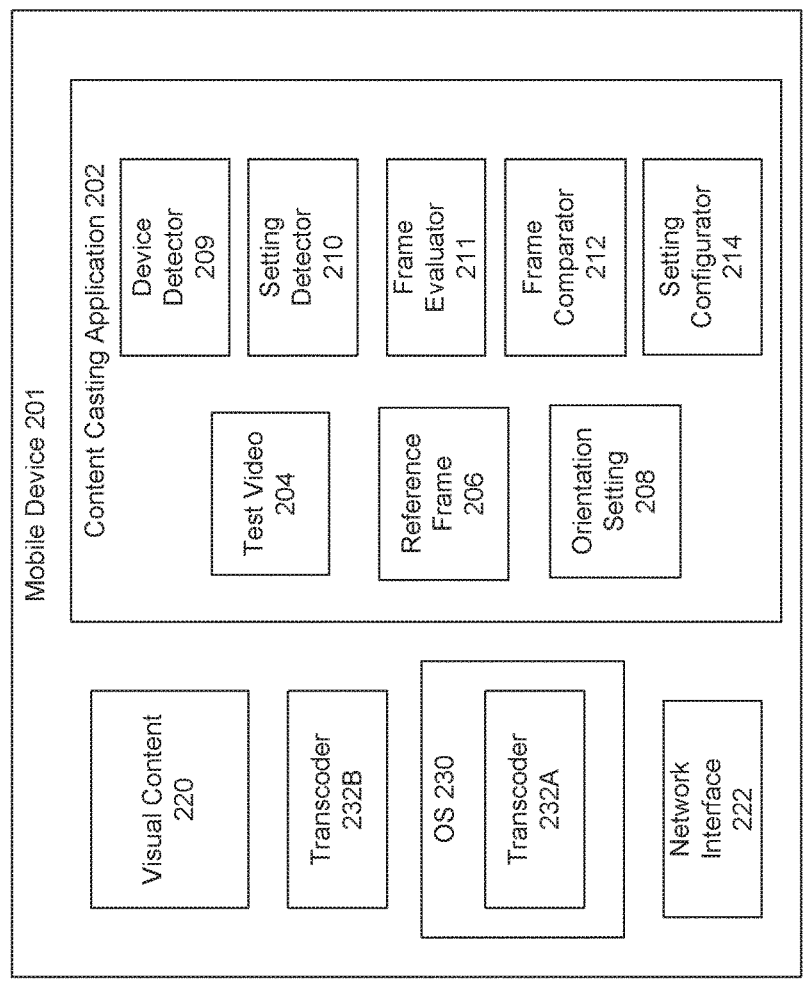
FIG. 2 is a block diagram of components within a mobile device, according to an example embodiment.

FIG. 2 illustrates a block diagram 200 of mobile device 201, according to an example embodiment. In an embodiment, mobile device 201 may be an example implementation of mobile device 108 of FIG. 1. Mobile device 201 may include content casting application 202, visual content 220, network interface 222, operating system (OS) 230, and transcoder 232.

Network interface 222 may include receivers and transmitters to enable wireless network communications between mobile device 201 and multimedia device 104 of FIG. 1. In an embodiment, network interface 222 may include circuitry for enabling a wired protocol (e.g., Ethernet) or a wireless protocol (e.g., BLUETOOTH or Wi-Fi) used in the network communications. For example, with regard to FIG. 1, mobile device 201 may transmit multimedia content, such as visual content 220, via network 116, to multimedia device 104 for casting on display device 102.

Visual content 220 may be image or video content that is stored in a memory of mobile device 201. In an embodiment, visual content 220 may be downloaded or cached from a network, such as network 114, via one or more web addresses. In an embodiment, visual content 220 may be video content that is recorded by a camera of mobile device 201. Mobile device 201 may often include a camera capable of recording visual content 220 at a high resolution and at a high bitrate. After recording, mobile device 201 may compress the recorded content using a video coding format supported by mobile device 201, and save or store visual content 220 in a video file format supported by mobile device 201. Additionally, visual content 220 may have a specific orientation, e.g., portrait or landscape. In an embodiment, visual content 220 may be associated or tagged with an orientation mode indicating the specific orientation. In an embodiment, the specific orientation may be specified by a rotation value. For example, rotation values may include 0, 90, 180, 270 degrees, or any other degree of rotation.

As explained above, in some cases, one or more of the file format, video coding format, streaming format, bitrate, or resolution (or size) of generated visual content 220 may not be supported by display device 102 or multimedia device 104. Therefore, mobile device 201 may need to transcode visual content 220 using a file format, video coding format, streaming format, bitrate, or resolution supported by display device 102 or multimedia device 104. In an embodiment, mobile device 201 may also transcode visual content 220 to limit congestion on network 116, or to create a smoother streaming process due to the limited bandwidth of network 116. In such a case, mobile device 201 may transcode visual content 220 to reduce the resolution or bitrate, which may affect a frame rate, such that visual content 220 may be smoothly casted on display device 102 in real-time using network 116.

OS 230 on mobile device 201 may include a multimedia library for processing visual content, such as visual content 220. In an embodiment, the multimedia library may include transcoder 232 for transcoding visual content 220. Typically, the multimedia library may include functions that provide low-level access of transcoding functions implemented on one or more graphics processing units (GPUs) of mobile device 201. A GPU is typically specially designed to process video and image data, and may improve transcoding performance when compared to a computing processor unit (CPU) of mobile device 108. For example, mobile device 201 operating an ANDROID based operating system may implement Stagefright or MediaCodec libraries, which each support a variety transcoders (having encoder and decoder functionality) for transcoding visual content 220. In an embodiment, OS 230 may provide access to transcoder 232 via an Application Programming Interface (API). In an embodiment, transcoding functions of transcoder 232 may be implemented and provided by a third-party application independent of OS 230.

Content casting application 202 may be a software application a content consumer downloads or installs onto mobile device 201 from a network such as network 114. In an embodiment, content casting application 202 includes test video 204, reference frame 206, and orientation setting 208.

Test video 204 may be a short video clip that is downloaded as part of content casting application 202 on mobile device 201. For example, test video 204 may be a one second video clip. Test video 204 may include one or more key frames. A key frame may include patterns that make the key frame appear distinct across each possible rotation of test video 204. For example, test video 204 may include a key frame that is distinct for each of a rotation of 0, 90, 180, and 270 degrees. In an embodiment, test video 204 may be tagged with an orientation mode indicating test video 204's orientation, e.g., portrait or landscape. In an embodiment, the orientation mode may include a rotation value, e.g., 0, 90, 180, or 270 degrees. Content casting application 202 may operate on test video 204 to determine an orientation adjustment that should be applied to visual content 220 such that visual content 220 is casted on, for example, display device 102 of FIG. 1 in the correct orientation. In an embodiment, content casting application 202 may use one or more test frames or images instead of test video 204 to determine the orientation adjustment. In an embodiment, content casting application 202 may include multiple test video 204, each corresponding to and tagged by a possible orientation. For example, content casting application 202 may include four test videos 204, one for each of the possible four rotation values, i.e., 0, 90, 180, or 270 degrees.

Reference frame 206 may include a correctly transcoded, resulting key frame of test video 204. In an embodiment, reference frame 206 includes a resulting frame for each of test video 204. Reference frame 206 represents a resulting key frame that has been transcoded into the correct orientation, i.e., the same orientation as the frame before transcoding. In an embodiment, reference frame 206 may be preconfigured. For example, reference frame 206 may be downloaded as part of content casting application 202. In an embodiment, as part of installing content casting application 202, a frame evaluation method may execute to calculate reference frame 206 for each test video 204. The frame evaluation method may be performed by, for example, frame evaluator 211 that is further described below.

Content casting application 202 may compare a transcoded frame of test video 204 with a corresponding reference frame 206 to determine an orientation adjustment used in transcoding visual content 220 into the correct orientation. In an embodiment, the determination is based on an orientation adjustment associated with or assigned to reference frame 206.

Orientation setting 208 may store a previously determined orientation adjustment for transcoding visual content 220 of a specific orientation. For example, orientation setting 208 may store a value indicating an orientation adjustment of one of 0, 90, 180, 270 degrees clockwise (or counterclockwise) for visual content 220 having a portrait orientation. In an embodiment, the portrait orientation may be indicated by a rotation value such as 90 degrees. When content casting application 202 transcodes visual content 220 having a portrait orientation, content casting application may use the stored orientation adjustment to transcode visual content 220 into content having the original portrait orientation. In an embodiment, orientation setting 208 may include an orientation adjustment for each possible orientation represented by, for example, 0, 90, 180, or 270 degrees. Other possible orientations, for example, may include portrait or landscape. In an embodiment, orientation setting 208 may be initially unset when content casting application 202 is downloaded or installed on mobile device 201. In an embodiment, orientation setting 208 may be cleared whenever content casting application 202 is updated or OS 230, including transcoder 232, is updated.

To enable visual content 220 to be transcoded into the correct orientation, content casting application 202 may include the following components: device detector 209, setting detector 210, frame evaluator 211, frame comparator 212, and setting configurator 214. A component of content casting application 202 may include a selection of stored operations that when executing in one or more processors within mobile device 201 causes the one or more processors to perform the operations of the component. Each of these components are discussed in turn.

Device detector 209 may detect a multimedia device, such as multimedia device 104, that is within range for real-time streaming or casting of visual content 220 to a display device, such as display device 102, coupled to multimedia device 104. In an embodiment, device detector 209 may receive indication of multimedia device 104 and the types of streaming format, video file format, video coding formats, resolution, and bitrates supported by multimedia device 104. In an embodiment, device detector 209 may receive indication of multimedia device 104 and look up supported formats, resolutions, and bitrates stored in content casting application 202 or from the Internet.

Setting detector 210 may initiate a process to determine an orientation adjustment for transcoding visual content 220. Particularly, setting detector 210 may check whether orientation setting 208 is set. If orientation setting 208 is cleared or unset, setting detector 210 determines that an orientation adjustment needs to be calculated. In an embodiment, setting detector 210 may run whenever visual content 220 is to be casted by content casting application 202. In an embodiment, content casting application 202 may include one orientation setting 208 for each possible orientation of visual content 220. Therefore, setting detector 210 may determine whether each orientation setting 208 has been set or configured. Then, setting detector 210 initiates the orientation adjustment determination process for each orientation setting 208 that is unset or has been cleared.

In an embodiment, setting detector 210 may perform the checking when transcoding software on mobile device 201 is installed or updated. For example, setting detector 210 may be initiated whenever OS 230, transcoder 232, or content casting application 202 is installed or updated.

Frame evaluator 211 may convert an input frame into a form that is comparable to reference frame 206. Particularly, frame evaluator 211 may map an input frame having a 2D bitmap representation into a vector representation with an ordered set of data values. In an embodiment, this vector representation may be the same or substantially similar for key frames of different resolutions. In an embodiment, to generate reference frame 206 from a key frame of test video 204, frame evaluator 211 maps a 2D, bitmap representation of the key frame into a vector representation having an ordered set of data values that is unique across each possible rotation of test video 204.

Frame comparator 212 may compare test video 204 transcoded by transcoder 232 with a corresponding reference frame 206 to determine an orientation adjustment to be stored in orientation setting 208. For example, content casting application 202 may include multiple reference frames 206, each corresponding to test video 204 tagged by a possible orientation. In an embodiment, frame comparator 212 may select an orientation adjustment, e.g., no rotation or 0 degrees, from possible orientation adjustments to be used in transcoding test video 204. For example, possible orientation adjustments may include 0, 90, 180, or 270 degrees clockwise (or counter clockwise). Then, frame comparator 212 may use the selected orientation adjustment when requesting transcoder 232 to transcode test video 204. In an embodiment, frame comparator 212 may send the selected orientation adjustment as a parameter to transcoder 232 along with test video 204. For example, frame comparator 212 may send test video 204 and the selected orientation adjustment to transcoder 232 within an API call provided by OS 230.

In an embodiment, frame comparator 212 may instead adjust or algorithmically rotate test video 204 according to the selected orientation adjustment before sending to transcoder 232. In an embodiment, frame comparator 212 may call a rotation routine from OS 230 to apply the selected orientation adjustment. In the above example, since the selected orientation is no rotation, frame comparator 212 sends test video 204 to transcoder 232 without any adjustments.

Transcoder 232, such as transcoder 232, then transcodes test video 204 in a specific orientation, e.g., rotated 90 degrees, to generate one or more transcoded frames. Then, frame comparator 212 may compare a generated, transcoded frame with a corresponding reference frame 206 to determine whether the generated frames had been transcoded into the correct orientation, e.g., rotated 90 degrees.

In an embodiment, to compare a generated frame, frame comparator 212 may use frame evaluator 211 to convert the generated frame into a form that is comparable with one reference frame 206 corresponding to the generated frame. Due to the bitmap to vector mapping performed by frame evaluator 211, frame comparator may determine that the generated frame has been transcoded correctly when the converted frame matches reference frame 206. In an embodiment, the vector representation conversion of the generated frame may be substantially similar to reference frame 206. In this case, frame comparator 212 may perform "fuzzy" matching to determine that the converted frame matches reference frame 206 within a threshold. If the converted frame does not match reference frame 206, frame comparator 212 may select another possible, remaining orientation adjustment to re-perform the frame comparison. For example, if 0 degrees was the first selected orientation adjustment, frame comparator 212 may select from the following orientation adjustments: 90, 180, or 270 degrees.

Setting configurator 214 may configure orientation setting 208 when frame comparator 212 determines the orientation adjustment. For example, setting configurator 214 may store in orientation setting the orientation adjustment determined by frame comparator 214. In an embodiment with more than one orientation setting 208, setting configurator 214 may store a determined orientation adjustment for each corresponding orientation setting 208. For example, content casting application 202 may store orientation setting 208 for each test video 204.

In an embodiment, whenever mobile device 201 requests content casting application 202 to cast visual content 220 on, for example, display device 102, content casting application 202 may first retrieve the orientation adjustment stored in orientation setting 208 for the orientation of visual content 220. For example, for visual content 220 in a portrait mode, content casting application 202 finds orientation setting 208 for portrait visual content. Then, content casting application 202 may use the retrieved orientation adjustment for correctly transcoding visual content 220 for casting on display device 102.

Figure 3:
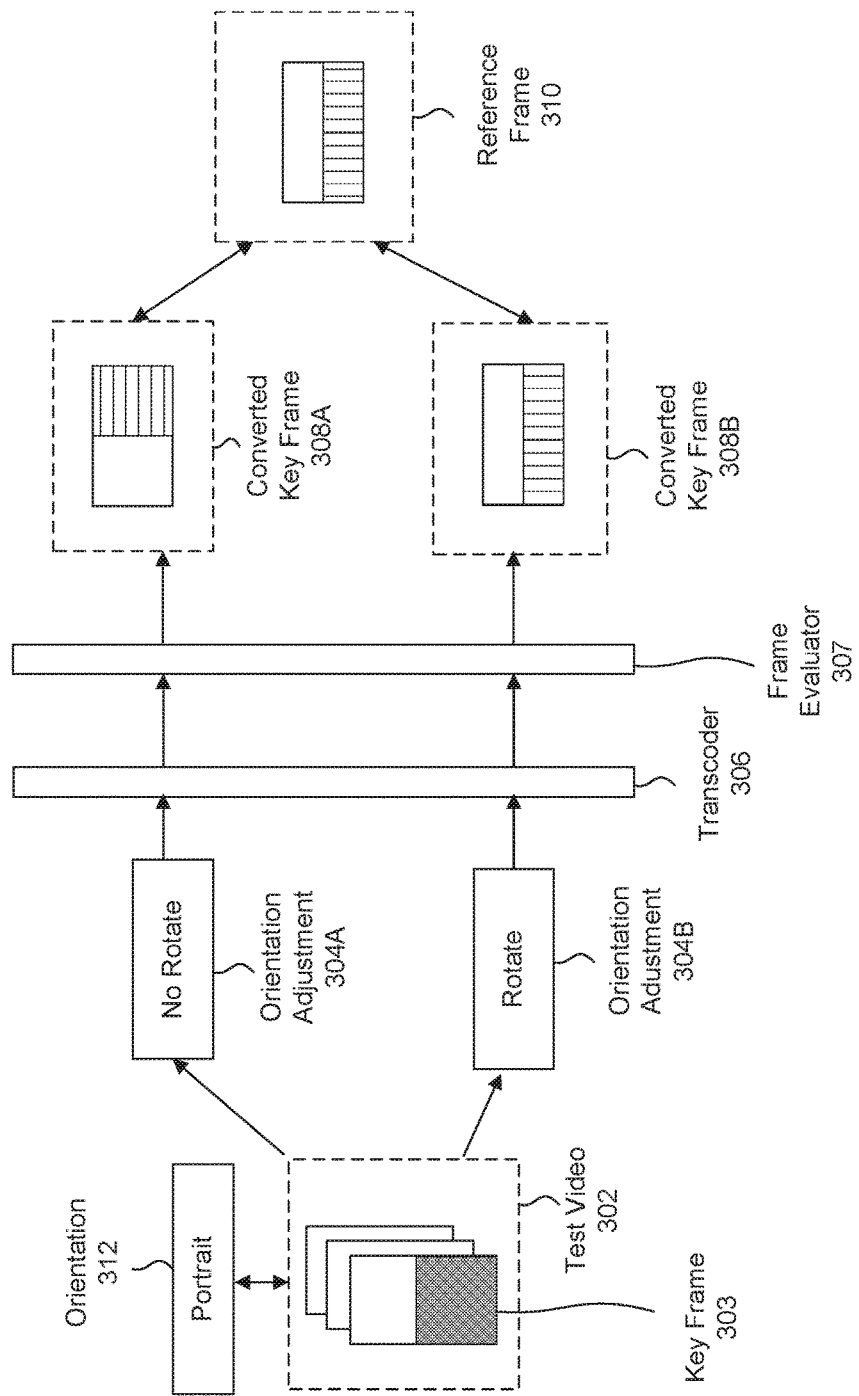
FIG. 3 is a diagram of converted transcoding results using different orientation settings, according to an example embodiment.

FIG. 3 illustrates a diagram 300 of converted transcoding results, converted key frames 308A-B, using different orientation adjustments 304A-B, according to an example embodiment. For ease of reference, diagram 300 is described with respect to mobile 201 of FIG. 2.

Test video 302, such as test video 204, may be, for example, one second of video and include multiple frames. In an embodiment, a key frame 303 of test video 302 may include, for example, half black pixels and half white pixels such that each possible rotation of key frame 303 yields a distinct frame. As depicted in FIG. 3, test video 302 is a portrait visual content and tagged by orientation 312 of "Portrait." In an embodiment, orientation 312 may be a value, such as 180 degrees. When setting detector 210 determines that orientation setting 208 for portrait visual content is unset, frame comparator 212 may select multiple from possible orientation adjustments, such as orientation adjustments 304A-B. Orientation adjustment 304A may be a value indicating "No Rotate" and orientation adjustment 304B may be a value indicating "Rotate." In an embodiment, other values are possible and include, for example, 270 degrees indicating an adjustment to rotate test video 302 270 degrees clockwise.

Frame comparator 212 may request transcoder 306, such as transcoder 232, to transcode test video 302 using selected orientation adjustments 304A-B. In the embodiment of diagram 300, transcoder 306 generates transcoded videos based on respective orientation adjustments 304A-B. A key frame from each transcoded video may be further converted by frame evaluator 307 into converted key frames 308A-B corresponding to orientation adjustments 304A-B, respectively. Each key frame may correspond to key frame 303. For representation purposes only, the pixelated key frame 303 within test video 302 may indicate an original form of key frame 303 stored in, for example, content casting application 202 of FIG. 2. In contrast, the striped representation of converted key frames 308B may represent a converted representation of key frame 303 transcoded by transcoder 306. For example, the converted representation may be a vector representation. Additionally, the different sizes or shapes of test video 302 compared to converted key frames 308A-B may be representative of different file formats, video coding formats, or streaming format used by transcoder 306.

Based on the specific hardware or software implementation of transcoder 306, key frame 303 of test video 302 was transcoded incorrectly to converted key frame 308A based on orientation adjustment 304A of "No Rotate." As shown, transcoded video 308A was transcoded to landscape content, which is different from the portrait orientation of test video 302. The transcoding process described acts as a proxy for how visual content, such as visual content 220, would be transcoded when casted on, for example, display device 102. When visual content 220 of orientation 312 is casted on display device 102, visual content 220 would be transcoded in a landscape orientation without any orientation adjustment, i.e., orientation adjustment 304A. So, a content consumer would need to rotate his or her head 90 degrees to the left to view the visual content of visual content 220.

In contrast, in an embodiment, key frame 303 of test video 302 is transcoded correctly to converted key frame 308B having portrait orientation based on orientation adjustment 304B. Frame comparator 212 may compare converted key frame 308B to reference frame 310, which include one or more reference frame 206, to determine that converted key frame 308B of test video 302 is transcoded into the correct, e.g., portrait, orientation 312. Subsequent to the comparison, setting configurator may set orientation setting 208 as orientation adjustment 304B.

In an embodiment, frame comparator 212 may first select orientation adjustment 304B such that one or more converted key frame 308B matches corresponding one or more frames of reference frame 310. In this embodiment, frame comparator 212 may determine the necessary orientation adjustment to be orientation adjustment 304B without needing to transcode test video 302 using orientation adjustment 304A.

Figure 4:
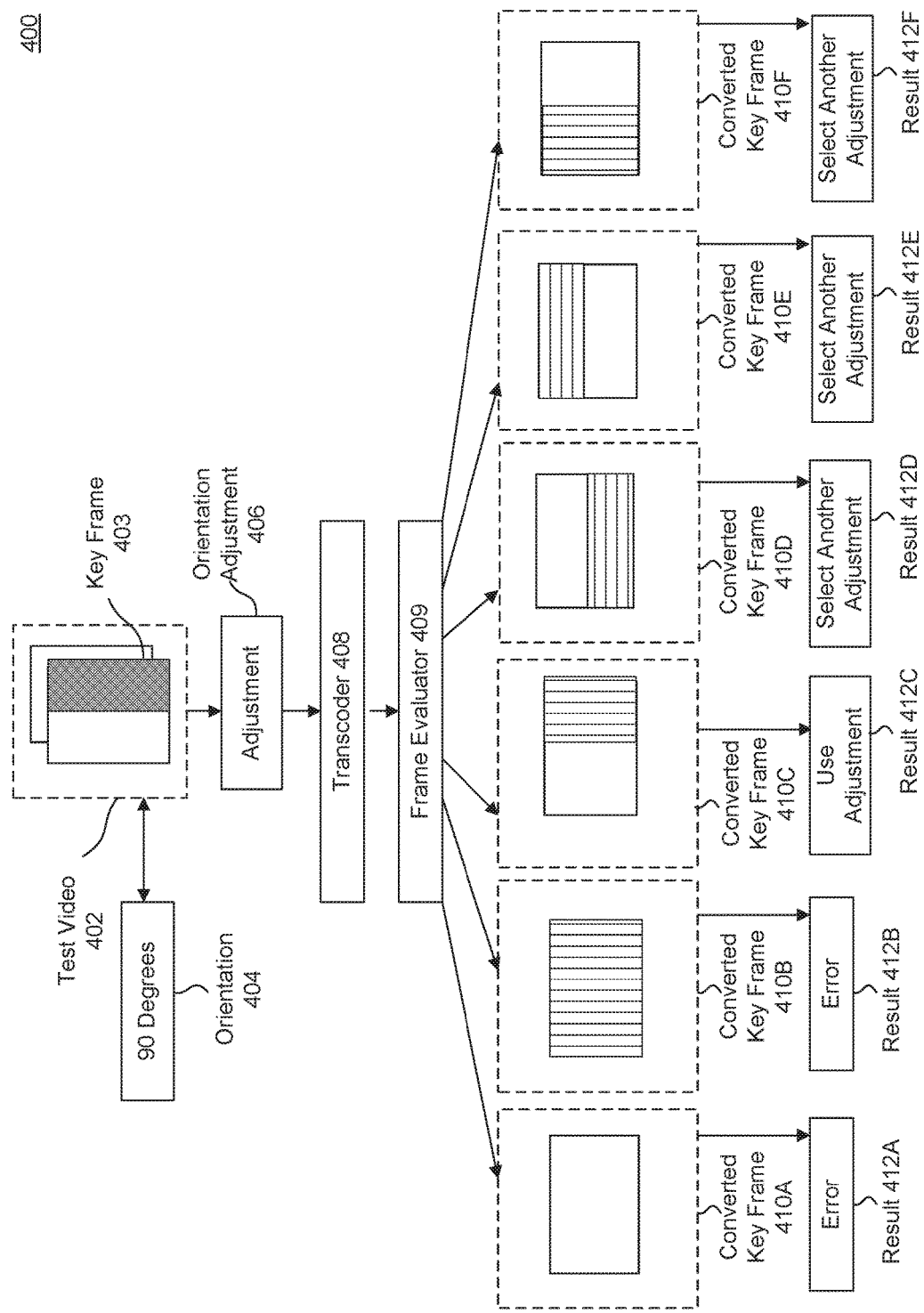
FIG. 4 is a diagram of possible transcoding results after conversion and based on an orientation setting, according to an example embodiment.

FIG. 4 illustrates a diagram 400 of possible transcoding results after conversion, converted key frames 410A-F, based on a selected orientation adjustment 406, according to an example embodiment. For ease of reference, diagram 400 may be described with respect to components of mobile device 201 of FIG. 2 although other computing devices may similarly be used.

Diagram 400 shows test video 402 having orientation 404 that is, for example, 90 degrees clockwise. Particularly, test video 402 includes at least one key frame 403 having pixels that when transcoded and converted is distinct across each possible orientation. For example, converted key frames 410C-410F represents a result of each possible rotation of 0, 90, 180, and 270 degrees clockwise, respectively. In an embodiment, based on orientation adjustment 406, "Adjustment," selected by frame comparator 212, transcoder 408 may generate one of the possible transcoded videos 410A-F. For example, "Adjustment" may be one of several values: 0, 90, 180, and 270 degrees clockwise. Frame comparator 212 may compare the test video 402 transcoded by transcoder 408, specifically a transcoded key frame converted by frame evaluator 409, to reference frame 206 to find a matching frame.

Based on the matched frame from reference frames 206, frame comparator 212 may determine a corresponding result 412. For example, key frame 403 of test video 402 may be transcoded by transcoder 408 and converted by frame evaluator 409 into one of the possible 6 converted key frames 410, which may each be representative of a vector representation of a respective transcoded key frame. If frame comparator 212 matches the transcoded and converted key frames 410A-B to respective reference frames 206 having the same or substantially similar vector representations, then frame comparator 212 may determine respective results 412A or 412B of error. In contrast, if the transcoded, converted key frame is 410C, which matches reference frame 206 having orientation 404, frame comparator 212 may determine result 412C to be using the "Adjustment" of selected orientation adjustment 406. Finally, if the transcoded video is one of converted key frame 410D-F, each corresponding to an incorrect rotation of 90, 180, and 270 degrees clockwise, respectively, frame comparator 212 may determine a corresponding result 412D-F to be to try selecting a remaining or another orientation adjustment to use as selected orientation adjustment 406.

Figure 5:
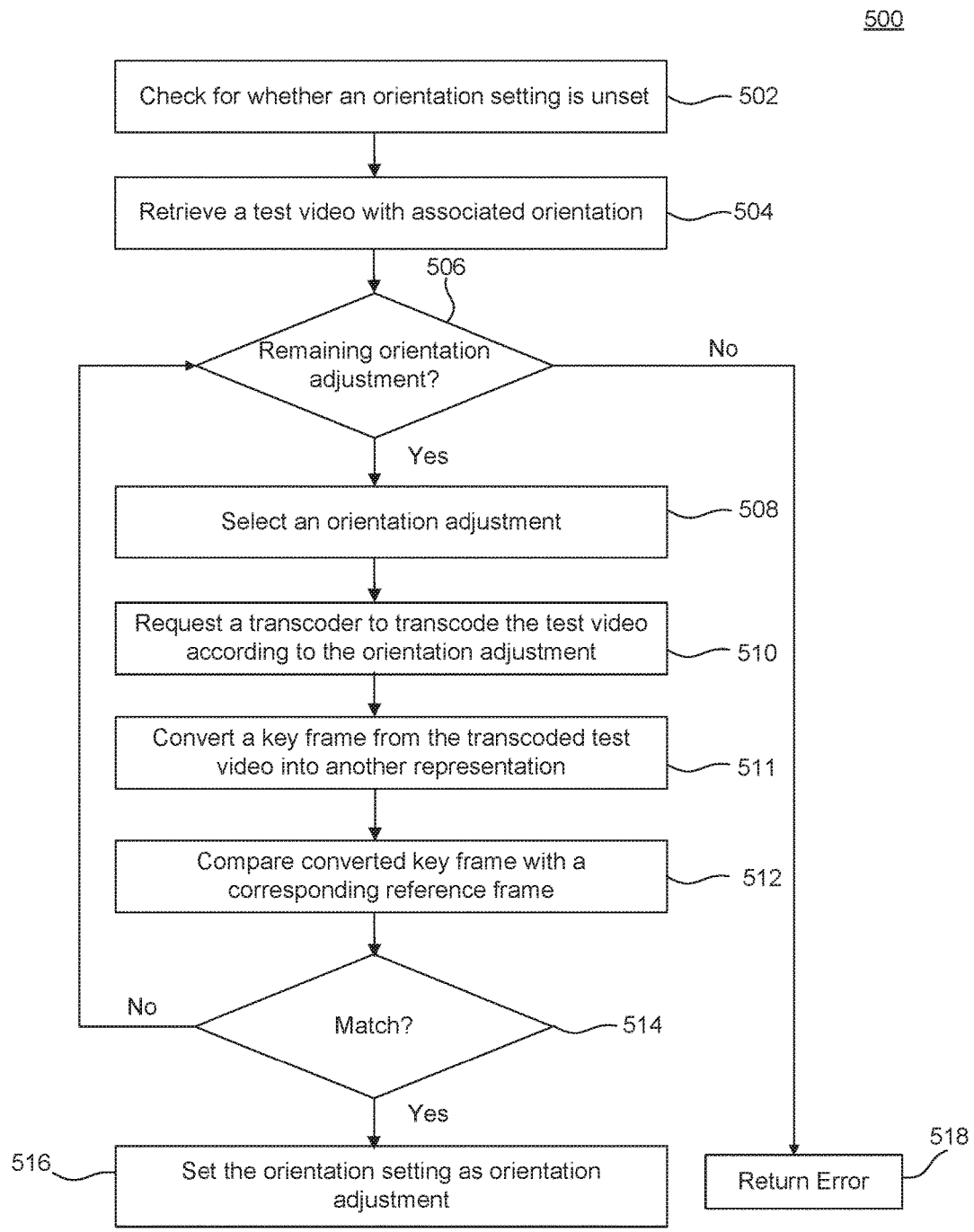
FIG. 5 is a flowchart of a method for configuring an orientation setting, according to an example embodiment.

FIG. 5 is a flowchart that illustrates a method 500 for configuring an orientation setting to enable visual content to be transcoded to a correct orientation, according to an example embodiment. Method 500 can be performed by processing logic that may comprise hardware (e.g., circuitry, dedicated logic, programmable logic, microcode, etc.), software (e.g., instructions running on a processing device), or a combination thereof. In an embodiment, steps of method 500 may be performed by a content casting application within a mobile device, such as content casting application 202 of mobile device 201 from FIG. 2.

In step 502, a setting detector, such as setting detector 210, checks for whether an orientation setting, such as orientation setting 208, for a test video, such as test video 204, is set. The orientation setting may indicate orientation adjustment information, such as rotation amount, used in transcoding visual content, such as visual content 220, for casting or streaming on a display device, such as display device 102 of FIG. 1.

In step 504, a frame comparator, such as frame comparator 212, retrieves the test video with an associated orientation. For example, a retrieved test video may be test video 302 of FIG. 3 and having a portrait orientation 312.

In step 506, the frame comparator may determine whether there is a remaining orientation adjustment to apply to the test video for transcoding. If no possible orientation adjustment remains such that the test video can be correctly transcoded to its original orientation, method 500 proceeds to step 518 where content casting application 202 may indicate a transcoding error.

In step 508, the frame comparator selects an orientation adjustment, such as orientation setting 304B of FIG. 3, from the remaining possible orientation adjustments.

In step 510, the frame comparator requests a transcoder, such as transcoder 232 of OS 230, to transcode the test video according to the selected orientation adjustment of step 508. In an embodiment, the frame comparator may send the selected orientation adjustment as a parameter via an API provided by OS 230 to transcoder 232 within OS 230. The transcoder, such as transcoder 232, generates a transcoded video, such as transcoded video 308B, including one or more frames.

In step 511, a frame evaluator, such as frame evaluator 211, converts a key frame from the transcoded video of step 510 into a representation that may be compared to a reference frame, such as reference frame 310 of FIG. 3. The reference frame may be a vector representation of a correctly transcoded and converted key frame from the test video having the associated orientation. In an embodiment, the frame evaluator may map the key frame from a bitmap representation into a vector representation.

In step 512, the frame comparator compares the converted key frame of step 511 to the corresponding reference frame, such as reference frame 310, to determine whether the transcoded test video has been correctly transcoded. The reference frame may represent a corresponding converted key frame of the test video that has been correctly transcoded to the original orientation of the test video.

In step 514, if the frame comparator does not match the converted key frame of step 511 with the corresponding reference frame, method 500 proceeds to step 506 where the frame comparator may proceed to try or select another orientation adjustment if any remains. In contrast, if the frame comparator matches the converted key frame of step 511, then method 500 proceeds to step 516.

In step 516, a setting configurator, such as setting configurator 214, sets the orientation setting to the most recently selected orientation adjustment of step 508. In an embodiment, the setting configurator stores the selected orientation adjustment in orientation setting.

In future operations, whenever the content casting application casts visual content having the same orientation as the test video, such as visual content 220, to the display device, the content casting application uses the stored orientation adjustment when transcoding each frame of the visual content. Therefore, each frame of the visual content will be transcoded to the original orientation of the visual content and casted in the original orientation on the display device. Specifically, the content casting application may send the each transcoded frame of the visual content to multimedia device 104 of FIG. 1 via network interface 222. In an embodiment, the content casting application may locate or find an orientation setting assigned the same orientation as the orientation of the visual content to be casted. If the located orientation setting is unset, the content casting application may start method 500 in step 502 to set that orientation setting.

Figure 6:
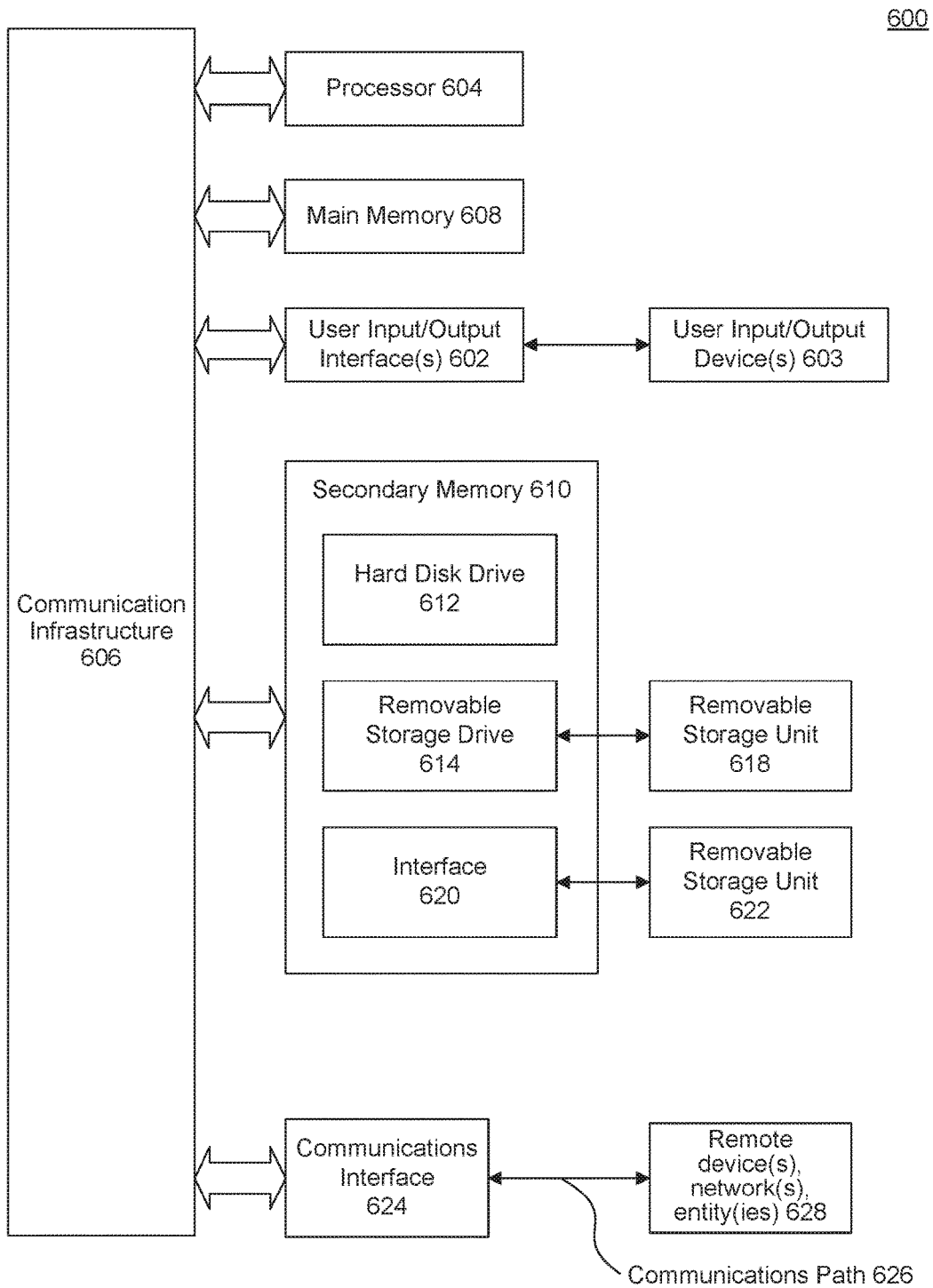
FIG. 6 is a diagram illustrating an example computing system, according to an embodiment.

Various embodiments, such as mobile device 201 of FIG. 2 or devices of FIG. 1, can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (CPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   applying a first offset to a video frame to produce a first offset frame;
   applying a second offset to the video frame to produce a second offset frame;
   transcoding the first offset frame with a transcoder to produce a first transcoded frame;
   transcoding the second offset frame with the transcoder to produce a second transcoded frame;

determining that an orientation of the first transcoded frame matches an orientation of a reference frame based on a comparison of the first transcoded frame to the reference frame;

in response to the determining, selecting the first offset; and associating the first offset with the transcoder.

2. The method of claim 1, further comprising:

transcoding visual content with the first offset to generate a transcoded visual content; and transmitting the transcoded visual content to a display device.

3. The method of claim 1, further comprising:

selecting the first offset in response to determining that the visual content includes an orientation that matches an orientation of the video frame.

4. The method of claim 1, further comprising:

selecting the first offset from a plurality of offset values listed in a rotation routine.

5. The method of claim 1, wherein the selecting further comprises:

determining that an orientation of the second transcoded frame differs from the orientation of the reference frame based on the comparison of the second transcoded frame to the reference frame; and selecting the first offset in response to the determining.

6. The method of claim 1, wherein the determining further comprises:

performing a fuzzy comparison to determine that the orientation of the first transcoded frame matches the orientation of the reference frame.

7. The method of claim 1, wherein the video frame is a frame from a test video stored on a mobile communication device.

8. A system, comprising:

a memory; and at least one processor coupled to the memory and configured to:

apply a first offset to a video frame to produce a first offset frame;

apply a second offset to the video frame to produce a second offset frame;

transcode the first offset frame with a transcoder to produce a first transcoded frame;

transcode the second offset frame with the transcoder to produce a second transcoded frame;

determine that an orientation of the first transcoded frame matches an orientation of a reference frame based on a comparison of the first transcoded frame to the reference frame;

in response to the determining, select the first offset; and associate the first offset with the transcoder.

9. The system of claim 8, the at least one processor further configured to:

transcode visual content with the first offset to generate a transcoded visual content; and transmit the transcoded visual content to a display device.

10. The system of claim 8, the at least one processor further configured to:

select the first offset in response to determining that the visual content includes an orientation that matches an orientation of the video frame.

11. The system of claim 8, the at least one processor further configured to:

select the first offset from a plurality of offset values listed in a rotation routine.

12. The system of claim 8, wherein to select the first offset, the at least one processor is further configured to:

determine that an orientation of the second transcoded frame differs from the orientation of the reference frame based on the comparison of the second transcoded frame to the reference frame; and select the first offset in response to the determining.

13. The system of claim 8, wherein to determine that the orientation of the transcoded frame matches the orientation of the reference frame, the at least one processor is further configured to:

perform a fuzzy comparison to determine that the orientation of the first transcoded frame matches the orientation of the reference frame.

14. The system of claim 8, wherein the video frame is a frame from a test video stored on a mobile communication device.

15. A non-transitory computer-readable device having instructions stored thereon that, when executed by at least one computing device, cause the at least one computing device to perform operations comprising:

applying a first offset to a video frame to produce a first offset frame;

applying a second offset to the video frame to produce a second offset frame;

transcoding the first offset frame with a transcoder to produce a first transcoded frame;

transcoding the second offset frame with the transcoder to produce a second transcoded frame;

determining that an orientation of the first transcoded frame matches an orientation of a reference frame based on a comparison of the first transcoded frame to the reference frame;

in response to the determining, selecting the first offset; and associating the first offset with the transcoder.

16. The non-transitory computer-readable device of claim 15, the operations further comprising:

transcoding visual content with the first offset to generate a transcoded visual content; and transmitting the transcoded visual content to a display device.

17. The non-transitory computer-readable device of claim 15, the operations further comprising:

selecting the first offset in response to determining that the visual content includes an orientation that matches an orientation of the video frame.

18. The non-transitory computer-readable device of claim 15, the operations further comprising:

selecting the first offset from a plurality of offset values listed in a rotation routine.

19. The non-transitory computer-readable device of claim 15, wherein the selecting further comprises:

determining that an orientation of the second transcoded frame differs from the orientation of the reference frame based on the comparison of the second transcoded frame to the reference frame; and selecting the first offset in response to the determining.

20. The non-transitory computer-readable device of claim 15, wherein the determining further comprises:

performing a fuzzy comparison to determine that the orientation of the first transcoded frame matches the orientation of the reference frame.

* * * * *